United States Patent

Shaheen

[15] 3,675,032

[45] July 4, 1972

[54] REMOTE VEHICLE STARTING SYSTEM

[72] Inventor: John Shaheen, Roslindale, Mass.

[22] Filed: May 11, 1970

[21] Appl. No.: 36,272

[52] U.S. Cl. ...................................290/38 C, 290/DIG. 3
[51] Int. Cl. ..........................................................F02n 11/08
[58] Field of Search .................290/36, 37, 38, 41, 40, 38 C, 290/DIG. 3

[56] References Cited

UNITED STATES PATENTS

| 2,544,955 | 3/1951 | Harrelson | 290/38 C |
| 2,444,460 | 7/1948 | Moncrief | 290/38 |
| 3,455,403 | 7/1969 | Hawthorne | 290/38 |

FOREIGN PATENTS OR APPLICATIONS 688,131   6/1964   Canada..............................290/DIG. 3

Primary Examiner—Bernard A. Gilheany
Assistant Examiner—W. E. Duncanson, Jr.
Attorney—Morse, Altman & Oates

[57] ABSTRACT

A relay unit is mounted in the vehicle and connected to the vehicle's electrical system. A detachable cable connects the relay unit to a control unit located in the house or other remote location. From the remote location, the system may be set to apply a charge to the vehicle's battery, then to start the vehicle's engine and operate the heater control so that the engine and the compartment will be warm and ready to be driven when the operator goes out to drive the vehicle.

4 Claims, 3 Drawing Figures

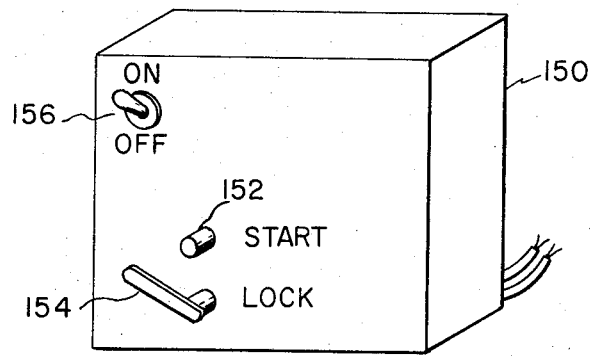
FIG. 2
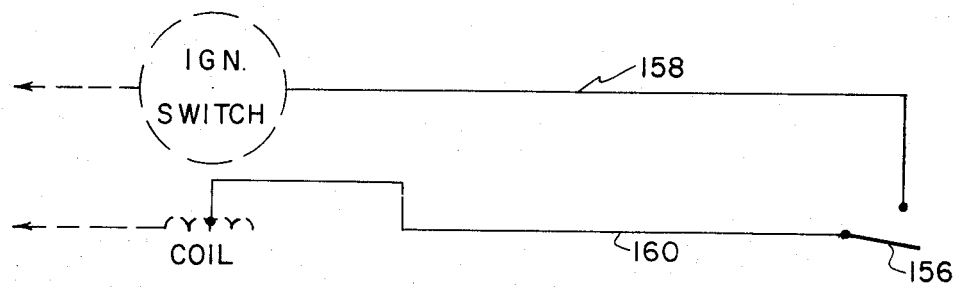
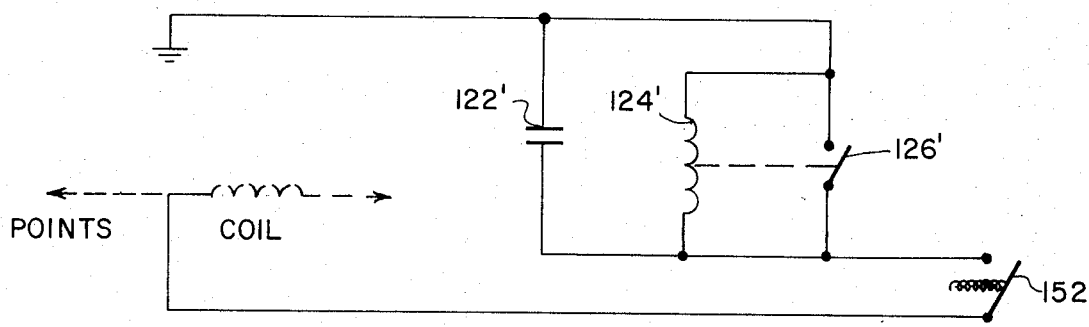
FIG. 3
INVENTOR
JOHN SHAHEEN
BY
Morse, Altman + Oates
ATTORNEYS

REMOTE VEHICLE STARTING SYSTEM

BACKGROUND OF THE INVENTION

1. Field of the Invention

This invention relates generally to starting systems for motor vehicles and more particularly is directed towards a system for starting a motor vehicle from a remote location.

2. Summary of the Prior Art

Many motor vehicles are difficult to start in cold weather after being parked overnight. This problem is aggravated if the car is parked outside so as to be exposed to the elements and tends to increase with the age of the car. Even new cars will experience difficulty in starting in very cold weather or in particularly damp weather. Even if the vehicle starts easily, the driver usually must wait for some time until the engine has warmed sufficiently as to run easily and it may be 5 or 10 minutes before the interior of the car has reached a comfortable temperature.

It is an object of the present invention to provide a system for remotely starting the engine of a motor vehicle even under severe weather conditions. IT IS ANOTHER OBJECT OF THIS INVENTION TO PROVIDE A remote starting system for motor vehicles which can be used to charge the vehicle's battery, operate the heater controls and perform other functions from a remote location.

SUMMARY OF THE INVENTION

This invention features a system for starting a motor vehicle from a remote location, comprising a relay system mounted in the vehicle and operatively connected to the vehicle's electrical system and a control unit connected to the relay unit by means of a detachable cable, the control unit being located in a house or other remote position. The control unit is connectable to house current and through a switch and transformer to the car battery for charging the same. The control unit includes switches for actuating relays to start the motor, inject a starting fluid into the carburetor, and actuate the throttle and the heater control. The system also includes a vibrator circuit which increases the voltage and multiplies the spark at the plugs to enhance the starting action.

BRIEF DESCRIPTION OF THE DRAWINGS

FIG. 2 is a perspective view of a modification of the invention, and, FIG. 3 is a circuit diagram of the FIG. 2 embodiment.

DETAILED DESCRIPTION OF THE PREFERRED EMBODIMENTS

Figure 1:
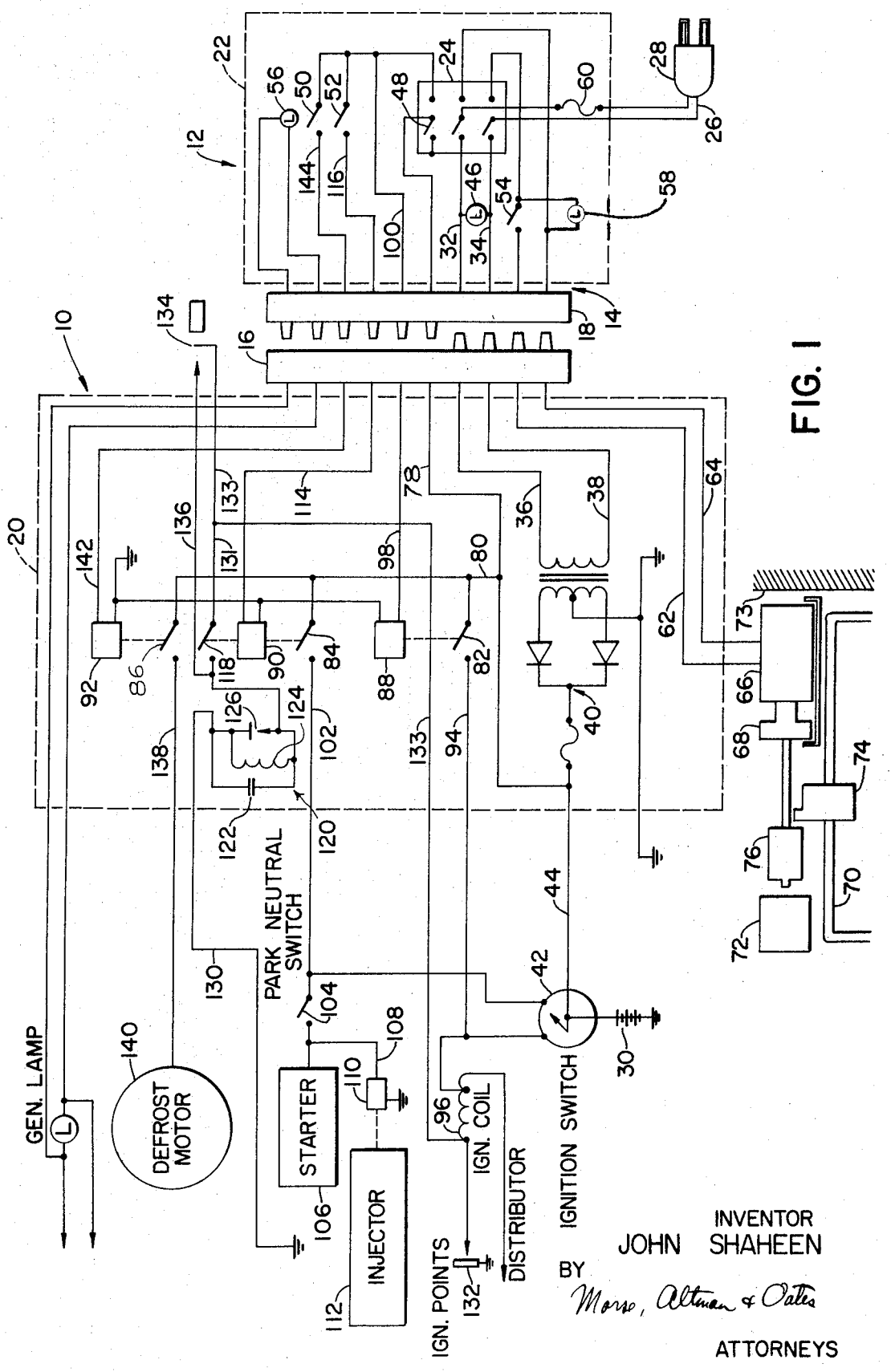
FIG. 1 is a schematic diagram of a remote motor vehicle starting system made according to the invention.

Referring now to the drawings, the system is generally organized into two operating units namely, a relay unit 10 and a control unit 12, the relay unit 10 being mounted typically in the engine compartment of the vehicle while the control unit 12 is located in the house or other remote location. The two units are connected by an elongated cable 14 and plug connectors 16 and 18. In practice, the cables 14 may run 20, 30, 40 feet or more but for the purposes of illustration have been foreshortened. In practice, the electrical components of each of the units 10 and 12 are mounted in appropriate housings 20 and 22, respectively. The unit 12 serves as the remote control unit whereby an operator may start his vehicle from his house, for example, without going outside so that the vehicle's engine will be started and warmed up for the operator when he is ready to drive the vehicle. The relay unit includes associated relays, transformers, etc., and is connected to the electrical system of the vehicle for carrying out certain defined functions.

The control unit 12 is generally organized about a three-pole, double throw switch 24, the lower two poles of which are connected by a pair of leads 26 to a plug 28 for connection to house current. The left-hand portion of the switch 24 is used to provide a trickle charge to the vehicle's battery 30. The circuit for applying the charge to the battery includes leads 32 and 34 in the control unit and leads 36 and 38 in the relay unit, the latter being connected to a transformer and rectifying circuit 40 connected to the battery 30 through the vehicle's ignition switch 42 by means of a lead 44. Thus by closing the bottom two contacts of the switch 24, a charge will be applied to the battery. A lamp 46 is provided for a visual indication that the batter is being charged.

The control unit also includes remote ignition contacts 48 forming part of the switch 24 and prepares the circuit for starting and running when the trickle charge contacts have been opened. Also, included in the control unit is a switch 50 which operates the defrost motor in the vehicle, a starter switch 52 which connects to the starting motor for the vehicle and a switch 54 which operates the throttle mechanism as will be described more fully below. Switches 52 and 54 are both of the push button, momentary contact, normally open type while switch 50 is an SPST toggle switch. A lamp 56 on the control panel is connected in parallel to the engine's generator light to indicate visually to the operator that the engine has started. A third lamp 58 is connected across the 115 volt AC line to indicate when the switch 24 is in the engine starting position and a fuse 60 is also provided in the leads 26 for the line to the house current.

Referring now more particularly to the relay unit 10, this unit includes leads 62 and 64 to a gas feed solenoid 66 provided with a plunge 68 drivingly connected to the accelerator linkage 70 which, in turn, is linked to the vehicle's carburetor 72. In practice, the gas feed solenoid 66 is mounted in a line as direct as possible with the carburetor linkage and preferably is mounted on the vehicle's fire wall 73. A stop 74 is mounted on the linkage 70 to engage a cooperating end piece 76 on the plunger extension from the gas feed solenoid plunger. It will be understood that when the solenoid is energized by closure of the switch 54 at the control unit the plunger will be retracted or pulled to the right as seen in the drawing and this, in turn, bringing the end piece 76 against the stop 74 to thereby pull the linkage 70 to the right, feeding gas into the engine.

The relay unit 10 includes a lead 78 which connects from the plug member 16 to the ignition lead 44 and is also electrically connected by lead 80 to contacts 82, 84 and 86 of relays 88, 90 and 92 respectively. The relay contact 82, when closed completes a circuit through a lead 94 to an ignition coil 86, the relay 88 being energized through a lead 98 connected through a lead 100 to the contacts 48 in the switch 24.

Relay contacts 84 when closed by energization of the relay coil 90 forms a circuit through a lead 102, to a safety park neutral switch 104 to the starter 106. Associated with this circuit may be a lead 108 adapted to energize a solenoid 110 which, in turn, operates an injector 112 for squirting discrete amounts of fluids to the carburetor, the fluids being of a type adapted to facilitate the starting of the engine. The coil of the relay 90 connects through a lead 114, through the plug connection, through a lead 116 to the switch 52. Instead of the arrangement shown, the injection could, of course, be operated by means of a push button at the control unit and/or a push button on the dash to permit the operator to inject while sitting in the car.

The relay 90 includes a second set of contacts 118 which, when closed, operates a vibrator 120 including a capacitor 122 in parallel with a coil 124 which opens and closes a switch 126 at a high frequency. The vibrator is connected by a lead 130 to ground, to ignition points 132 and to the vehicle's distributor by leads 131 and 133. Operation of the vibrator causes a continuous high voltage to be produced by the ignition coil to the spark plugs, the increase in voltage and multiplication of the spark at the plugs greatly enhances the starting action, even in extremely cold damp weather. To permit this feature to be operative when the vehicle is not connected to the control unit 12, a push button switch 134 is provided, preferably on the dash board of the vehicle, and connected via lead 136 to the vibrator and via lead 133 to the points and distributor.

The contact 86 for the relay 92 connects via lead 138 to the defrost motor 140 for the vehicle, the relay coil 92 being energized via lead 142 through the plug connection to the switch 50 in a lead 144.

Instead of connecting the vibrator to work with the starter in the illustrated arrangement, the vibrator can also be connected to be operated by a push-button switch at the control unit 12.

The system is used by mounting the relay unit 10 under the hood of the car and the control unit in the house or other remote location, as desired. In typical practice when a vehicle, such as an automobile, is being locked up for the evening, the operator will plug the cable into the relay unit and put the hood down, positioning the cable so it will not be jammed. The operator then sets the heater vents to the defrost position and locks the car. In the house, the operator plugs the cord 28 into any ordinary house outlet, typically 115 volts AC. The system can be adapted by appropriate modifications for use with D.C. The unit may be left plugged in at all times since the switch 24, when in the off position, nothing can be operated. The operator normally will push the switch 24 into the trickle charge position, closing the lower two contacts as shown in the drawings. This will cause the lamp 46 to go on indicating that the battery is being charged. Normally the charger will be left on all during the night. The switch is designed so that when the charging circuit is on, the start, gas and defrost controls are automatically off.

In the morning, prior to going out, the operator will turn the switch 24 first to its off position to turn off the charging circuit and then into the ignition position closing the contact 48. The operator then presses the start button 52 to operate the starter in the car. He then presses the gas feed button 54 to choke and accelerate the carburetors. These button switchs 52 and 54 are operated in the same manner as the starter key and accelerator pedal in the vehicle. As soon as the motor starts, the lamp 56 connected to the generator light in the vehicle will go out. After a reasonable length of time, the operator will then turn the vehicle's defroster on by closing the switch 50. The motor will be left to run for a length of time determined by the judgement of the operator taking into consideration the weather conditions, the state of the vehicle and the operator's general familiarity with the vehicle's characteristics. Typically, the car might be allowed to run for anywhere from 5 to 15 minutes until it is fully heated for running. When the operator is prepared to leave, he shuts off the motor by pushing the switch 24 into the off position, unplugs the cable from the relay unit, winds it up and stores it in a conveniently mounted storage box which may be attached to the outside wall of the house near the cable lead.

Referring now to FIGS 2 and 3 of the drawings, there is illustrated a modification of the invention and in this embodiment a vibrator for multiplying the spark and increasing the voltage at the plugs is provided as a separate unit. The vibrator circuit is mounted in a housing 150 which may be mounted on the dashboard of the vehicle or in the glove compartment.

The unit includes a spring-loaded starter button 152 which may be locked in a closed position by means of an angularly movable finger 154 adapted to be pivoted into and out of locking engagement with the button 152.

The unit also includes an ignition cut out toggle switch 156 connected by leads 158 and 160 to the ignition switch and coil, respectively, whereby the driver may forestall theft of the vehicle by opening the switch 156 when the vehicle is parked and unoccupied.

The vibrator portion includes a capacitor 122', a coil 124' for vibrator contacts 126', the circuit being connected through the switch 152 via lead 162 to the distributor, coil and points as in the principal embodiment. Preferably, the vibrator utilizes a 25 ohm coil and a 0.15 microfarad capacitor, the circuit being operable at 6 or 12 volts without modification.

Having thus described the invention what I claim and desire to obtain by Letters Patent of the United States is:

1. A system for starting from a remote location the engine of a motor vehicle having a starter motor, a carburetor, an ignition switch, a battery, an ignition coil, points, a distributor, a generator lamp and a heater motor, comprising
   a. a relay unit mountable to said vehicle,
   b. a control unit mountable at said remote location,
   c. a cable detachably connecting said units,
   d. said system including battery charging means associated with one of said units,
   e. first switch means at said control unit for energizing said battery charging means,
   f. first relay means at said relay unit adapted to close a circuit to said starter,
   g. second switch means at said control unit in circuit with said first relay means for actuating said first relay means,
   h. solenoid means operatively connected to said carburetor,
   i. third switch means at said control unit for selectively actuating said solenoid,
   j. indicator means at said control unit responsive to the starting of said engine, and,
   k. an electrical vibrator circuit at said relay unit responsive to said first relay means, said vibrator circuit being connected to said coil, distributor and points.

2. A system for starting a motor vehicle comprising
   a. a vibrator circuit connected to selected portions of the vehicle's electrical system and when energized adapted to apply a high frequency spark of increased voltage to the spark plugs of said vehicle,
   b. a spring-loaded normally open switch connected to said circuit for selective operation thereof, and,
   c. locking means engageable with said switch for maintaining said switch in a closed position,
   d. said vibrator circuit including a coil and a capacitor operative within a range of 6 to 12 volts.

3. A system according to claim 1 including fifth switch means mountable to said vehicle and associated circuitry connected to said vibrator circuit, said coil, distributor and points and forming a by-pass of said first relay means.

4. A system according to claim 1 including a solenoid actuated fluid injector operatively connected to said carburetor and responsive to said first relay means.

* * * * *